United States Patent [19]

Gemgnani

[11] Patent Number: 4,819,374

[45] Date of Patent: Apr. 11, 1989

[54] THERMOPLASTIC FILMS FOR SOIL TREATMENT

[75] Inventor: Gregory Gemgnani, Rochester, N.Y.

[73] Assignee: Mobil Oil Corporation, New York, N.Y.

[21] Appl. No.: 708,110

[22] Filed: Mar. 5, 1985

Related U.S. Application Data

[60] Continuation of Ser. No. 510,719, Jul. 5, 1983, abandoned, which is a division of Ser. No. 317,029, Nov. 2, 1981, abandoned, which is a continuation-in-part of Ser. No. 102,728, Dec. 13, 1979, abandoned.

[51] Int. Cl.$^4$ .............................................. A01C 23/00
[52] U.S. Cl. .............................................. 47/58; 47/9
[58] Field of Search ................ 47/9, 58, 6; 428/475.8, 428/319.9, 424.6, 476.1

[56] References Cited

U.S. PATENT DOCUMENTS

| | | | |
|---|---|---|---|
| 3,020,859 | 2/1962 | Kang | 47/9 |
| 3,496,061 | 2/1970 | Freshour | 161/254 |
| 3,538,866 | 11/1970 | Gaines | 111/6 |
| 3,795,654 | 3/1974 | Kirkpatrick | 47/9 X |
| 3,900,670 | 8/1975 | Ikeda et al. | 428/319.9 X |
| 4,058,647 | 11/1977 | Inoue et al. | 428/476.1 |
| 4,266,370 | 5/1981 | Kodera et al. | 47/9 X |

FOREIGN PATENT DOCUMENTS 105187 8/1979 Japan .

Primary Examiner—Robert A. Hafer
Assistant Examiner—Danton D. DeMille
Attorney, Agent, or Firm—Alexander J. McKillop; Charles J. Speciale; James P. O'Sullivan, Sr.

[57] ABSTRACT

Thermoplastic films comprising laminates of polyolefin and a relatively thinner polyamide layer are employed as protective coverings over agricultural fields, which have been treated with fumigants. The improved resistance to fumigant vapor penetration of such laminates results in improved retention of the volatile fumigant materials in contact with the soil which is being treated.

14 Claims, 1 Drawing Sheet

THERMOPLASTIC FILMS FOR SOIL TREATMENT

This is a continuation of abandoned application Ser. No. 510,719, filed on July 5, 1983, which in turn is a divisional application of abandoned application Ser. No. 317,029, filed on Nov. 2, 1981, which in turn is a continuation-in-part application of abandoned Ser. No. 102,728 filed Dec. 13, 1979, which are incorporated by reference herein in their entirety.

BACKGROUND OF THE INVENTION

1. Field of the Invention

The present invention relates to laminar plastic films such as laminates of a polyolefin with a polyamide. Such films are particularly suited for protecting soils which have been previously treated with fumigants such as methyl bromide and chloropicrin, preventing escape of the applied fumigants until they have completely saturated the soil being treated.

2. Description of the Prior Art

Soil fumigation is employed extensively in certain growing areas in order to pretreat soil prior to planting in an effort to eradicate or reduce inoculum of soil pathogens. In some instances, soils are fumigated when specific diseases that cause unacceptable loses occur. Generally, soil fumigation is employed to treat soil which is to be planted with so called high risk-high value crops including for example, tobacco, strawberries, tomatoes, ornamental plants, and the like. It has been found that in the absence of such fumigation treatment, buildup of soil-born diseases that attack the root systems of such crops will occur and cause unacceptable crop loses. Agricultural soils are routinely fumigated with volatile chemicals such as methyl bromide or mixtures of methyl bromide with chloropicrin. These gases are injected into the soil to be treated with commercially available equipment. Because it may take up to 48 hours, and in some cases a week or more, following treatment before the gases have effectively saturated the soil being treated, and in view of the fumigants' high toxicity as well as the relatively high cost of such gases, it is desirable that the fumigant treated soil be completely covered with a barrier material such as for example, a thermoplastic sheet, immediately after it has been injected into the soil.

Currently in agricultural fumigation of soils, the barrier film which is most commonly employed is a low density polyethylene sheeting. However, it has been found that the conventional low density polyethylene films currently used as fumigant barriers offer only very limited resistance to the penetration of the fumigant vapors so that approximately ½ to ⅔ of the fumigant gas, such as methyl bromide and/or chloropicrin, after being applied to a field, escapes through the low density polyethylene barrier film. In addition to the attendant expense of the lost fumigant, there is increased concern regarding the adverse environmental aspects of soil fumigation and the escape into the atmosphere of such highly toxic gases. More stringent regulations limiting atmospheric emissions of this type may be forthcoming from regulatory agencies in the future. Another obvious disadvantage of escaping fumigants is the potential health hazards which are posed for individuals working in the immediate area, as well as residential areas which may surround farms employing such hazardous and toxic fumigant materials. Attempts to replace low density polyethylene films, because of its poor barrier characteristics, with othr materials such as polyester films, saran films and the like, all of which offer some improved barrier characteristics over monolayer low density polyethylene, have met with little success in view of the economic disadvantages attendant with the employment of such costly film substitutes. Unfortunately, until the advent of the present invention, monolayer low density polyethylene film has been the only effective film available in the quantity, cost, and with the physical strength requisites required for commercial fumigation.

SUMMARY OF THE INVENTION

A basic objective of the present invention is to provide effective soil fumigation with a minimum disturbance of the environment. Accordingly the present invention provides a retentive soil cover of high mechanical strength which allows the quantity of toxic fumigant chemicals employed to be reduced by upwards of fifty percent of the quantities which are currently employed when low density polyethylene is used as the barrier film. These objectives are met when, in accordance with the present invention, a barrier film is provided in the form of a laminate comprising a layer of a polyolefin having bonded thereto a thin coating layer of a polyamide. It has been found that when such a film is employed as a barrier covering over fumigated soil areas, escape of the volatile fumigant gases is dramatically reduced in comparison to low density polyethylene coverings. The laminar films of the present invention may be formed by extrusion coating a preformed polyolefin film, e.g. polyethylene, with a thin coating of a polyamide, e.g., nylon-6. Alternatively, the films may be preformed by extrusion and subsequently laminated together in the presence of adhesive materials, and the like. A still further method for producing these laminates comprises coextrusion, tubular or cast, of respective layers of the molten resinous materials through a common die orifice, utilizing coextrusion techniques which are well known to those skilled in the art. This latter technique of coextrusion is the preferred method for the production of the present laminates, although other hereinbefore described techniques may also be employed.

DESCRIPTION OF SPECIFIC EMBODIMENTS

Figure 1:
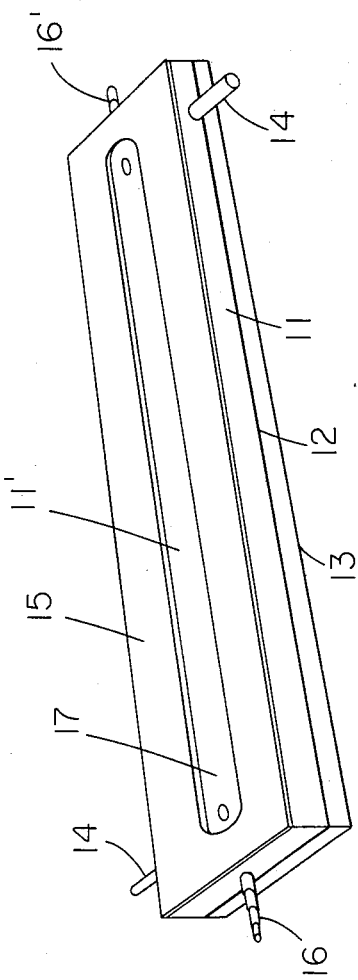
FIG. 1 is a schematic view of an apparatus which was employed to test the vapor barrier characteristics of the laminates of the present invention.

Commercially employed fumigating techniques will vary according to the soil being treated, the nature of the terrain, the crop for which the field is being prepared, and the nature of the problem the fumigation is intended to attack-fungus, insect, bacteria or weeds. Commercially available fumigating equipment includes vehicles such as a full-tracked tractor upon which may be mounted a series of tanks containing the various fumigants being used. Metering devices measure selected dosages of fumigants which are drilled or injected into the soil as the tractor moves across the field being treated. Attached to the same tractor and positioned behind the fumigant injectors, is a unit which carries the rolls of plastic barrier film. The film dispenser unit covers over the ground as soon as the fumigants are applied, minimizing escape of the applied fumigants. The coextruded films of the present invention provide exceptional gas barier resistance and the mechanical strength required for such field applications.

The contemplated polyamides broadly include the nylons which are long chain thermoplastic polymers having recurring amide groups as an integral part of the main chain. Specific nylons contemplated are nylon 6/6, 6/9, 6/10 and 6/12, the numerical designation referrring to the number of carbons in the diamine and diacid, respectively. A particularly preferred nylon is nylon-6 which is polymerized from the 6-carbon amino acid derivative, caprolactam.

The contemplated polyolefins include $C_2$–$C_4$ polyolefins, e.g., polyethylene, polypropylene, etc., and mixtures thereof. These polymers may be homopolymers or copolymers of either high or low density. Particularly preferred materials include low density polyethylene or high density polyethylene. The preferred polyethylenes also include those which result from the copolymerization of ethylene with a small percentage of a $C_4$–$C_{10}$ alpha olefin, e.g., octene-1. This includes linear low density copolymers of ethylene and the alpha olefin and high density copolymers of ethylene and the alpha olefin, e.g., 3% by weight of octene-1. The polyolefins may contain a minor amount of an ionomer resin blended therein.

The optimum thickness of the laminar barrier films of the present invention is generally dependent upon factors which include resin costs, effective barrier properties, mechanical strength necessary for handling in field applications, and similar considerations. Gauges in excess of 10 mils for example, while providing effective barrier properties, may present problems in handling and application to the soil being treated. It has been found that the laminar structures of the present invention when employed in thicknesses of from about 0.5 mil up to about 3 mils, and preferably about 1 to about 2 mils are quite effective. The ratio of a nylon layer thickness to polyolefin layer thickness may vary widely. However, preferred thickness ratios of a nylon to polyolefin are from about 1:40 up to about 1:4, and preferably about 1:9. In the following Example, a nylon 6-high density polyethylene laminate having an overall thickness of about 1.3 mils was prepared. The nylon layer was approximately 0.1 mil and the high density polyethylene layer was about 1.2 mils. It has been found that the chemical resistance of the nylon, even in gauges as low as 0.1 mil, significantly improves the barrier resistance of the resultant laminates in contrast to the conventional low density polyethylene single layer films which are currently commercially employed.

The following Example sets forth one of the coextrusion techniques which may be employed to produce the barrier laminate films of the present invention. The Example is presented for purposes of illustration only and, accordingly, should not be construed in a limited sense. In the Example a laminate comprising high density polyethylene and nylon was prepared. However, as indicated above, it will be understood that other forms of polyethylene, including low density polyethylene and copolymers thereof and high density polyethylene homopolymers may also be employed and are within the scope of the present invention.

EXAMPLE 1

High density polyethylene resin blended with approximately 8% of an ionomer resin identified by the manufacturer as Surlyn were fed into the hopper of a standard thermoplastic extruder. The Surlyn resin was employed in the present Example as an adhesion promoting agent which enhances the bonding characteristics of the high density polyethylene resin layer to the applied nylon-6 layer. The high density polyethylene resin employed was a copolymer of ethylene and about 3% by weight of octene-1. This resin is identified by the manufacturer as Alathon 7810, and has the following typical physical properties for a 1.2 mil film extruded at a 4.3:1 blow-up ratio:

| | |
|---|---|
| Density | .945 g/cc |
| Melt Index | .25 g/10 min. |
| Tensile Yield | |
| (MD) | 3,000 psi |
| (TD) | 3,100 psi |
| Elongation (2"/min.) | |
| (MD) | 660% |
| (TD) | 730% |
| Secant Modulus | |
| (MD) | 80 M psi |
| (TD) | 82 M psi |
| Elmendorf Tear | |
| (MD) | 45 gm/mil |
| (TD) | 247 gm/mil |
| Spencer Impact | 2.8 in. lbs/mil |
| Dart Drop (26") | 115 gm/mil |
| Tear Propagation ASTM D-2582 | |
| (MD) | 3.2 Kg force |
| (TD) | 3.7 Kg force |

The Surlyn, ionomer adhesion promoter resin, employed is of the type disclosed and described in detail in U.S. Pat. No. 3,496,061, the disclosure of which is incorporated herein by reference.

The ionomer resin may be characterized as a metal-containing ionic copolymer obtained by the reaction between ethylene or an alpha-olefin with an ethylenically unsaturated monocarboxylic acid such as acrylic or methacrylic acid wherein at least 10% of said carboxylic acid groups are neutralized by an alkali metal ion.

In preparing these ionic copolymers, the olefin ranges from about 80 to 99 mole percent with the unsaturated monocarboxylic acid ranging from about 1 to 20% and more preferably from about 1 to 10 mole percent. The olefin or ethylene, for example, and more specifically the alpha-olefin, may be characterized by the general formula $RCH=CH_2$, wherein R is either hydrogen or a radical selected from the group consisting of alkyl radicals having from 1 to 8 carbon atoms per molecule. This includes, for example, ethylene and olefin monomers such propylene, butene-1, pentene-1, heptene-1, hexene-1, 3-methyl butene-1, 4-methyl pentene-1, octene-1, etc. The olefins are copolymerized with an unsaturated monocarboxylic acid such as acrylic or methacrylic acid wherein the acid may range up to about 20 mole percent and more preferably in an amount ranging from about 1 to 10 mole percent. The base copolymers are converted to ionic copolymers by reacting said copolymers are converted to ionic copolymers by reacting said copolymer with an ionizable alkali metal compound. This reaction or neutralization with the alkali metal ion is sufficient to at least neutralize 10% of the carboxylic acid groups and more preferably 35–80% of the acid groups. A typical example of preparing an ionic copolymer comprises milling approximately a 500 gram sample of an ethylene-methylacrylic acid copolymer containing about 10 mole percent by weight of methacrylic acid to the mill temperature and then adding thereto about 24 grams of sodium methoxide, dissolved in about 100 mls. of methanol. The sodium methoxide, is added to the copolymer over a period of about five minutes and the copolymer is worked on the mill. Blending of the composition is continued for approximately 15 minutes, during which time the initially soft, fluid-melt becomes stiff and rubbery. An ionomer resin may be characterized as having a melt index of about 1.2 and a density of 0.938.

Nylon-6 resin was introduced into a satellite extruder and molten nylon resin was fed into the same tubular die as the high density polyethylene-Surlyn mixture. The nylon-6 resin was identified by the manufacturer as CAPRON 8207, and had the following physical properties:

| Density | 1.13 g/cc |
|---|---|
| Tensile, Yield | 11,800 psi (ASTM-D-638) |
| Deflection Temperature at 264 psi stress | 140° F. (ASTM-0-648) |

The resultant two ply laminated film produced in accordance with the present Example comprised adhered layers of the high density ethylene-octene-1 copolymer/ionomer mixture layer and the relatively thin nylon-6 layer, and had the following properties:

| Film Gauge | 1.0 mil. |
|---|---|
| Blow-up Ratio | 4/1 |
| Tensile, Ultimate | |
| (MD) | 8170 psi |
| (TD) | 4400 psi |
| Tensile, Yield | |
| (MD) | 2800 psi |
| (TD) | 3000 psi |
| Elongation | |
| (MD) | 560% |
| (TD) | 480% |
| Tear-Elmendorf | |
| (MD) | 28 gms/mil |
| (TD) | 440 gms/mil |
| Thickness of HOPE layer | 1.2 mils |
| Thickness of nylon layer | 0.1 mil |

The film produced in accordance with Example 1 was tested for its resistance to the diffusion of methyl bromide and chloropicrin therethrough. The following is a description of the apparatus, as shown in FIG. 1, which was employed to test the diffusion rates of the laminates produced in accordance with Example 1, and also to compare them with commercially available low density polyethylene films which are currently employed as fumigant barriers.

As shown schematically in FIG. 1 the diffusion testing apparatus consisted of two units, a top unit, not shown, which is an exact mirror image of the bottom unit illustrated in FIG. 1. The device comprises an aluminum plate 11, hollowed on its backside surface by machine milling and having a flat face 11'. Rubber gasket 12 and plate 13 are attached to the undersurface of aluminum plate 11 with screws (not shown) around the perimeter of the hollow backside of plate 11 to provide a water tight seal. Inlet valve 16 and outlet valve 16' are located at opposite ends of plate 11 and are provided for the circulation of temperature controlled water. The mating half of the apparatus (not shown), which is a mirror image of the apparatus shown in FIG. 1, was connected in series to complete the water circuit. Polyethylene separation sheet 15, into which is cut an oblong hole 17, hole 17 being the active area of diffusion, is adhesively secured to the face 11' of plate 11.

In operation, a piece of film to be tested was stretched across the face of the polyethylene sheet 15. The mating plate (not shown) was subsequently interfaced and the two were then pressed together with C clamps to provide a gas-tight seal. Water circulation was begun at room temperature (25° C.) and a known concentration of methyl bromide in air, flowing at 20 ml/min., was attached to inlet valve 16 of the lower plate. The gas flowed across the open hollow space of plate 11' and was vented through outlet valve 16'. To the inlet valve 16 of the upper plate was attached a supply of clean air, also flowing at the rate of 20 ml/min., flowing in a direction opposite the gas flow in the lower plate. The diffused methyl bromide was conducted via stainless tubing to a gas chromatograph (not shown) for periodic analysis.

When equilibrium diffusion was attained, indicated by a series of gas chromatograph recorder peaks of equal height, the water temperature was increased to 30° C. and measurements made until a steady state was again attained. In successive steps, the temperature was raised to 40°, 50° and finally to 60° C. Such temperature conditions are likely to be encountered in the field at the barrier film surfaces. The diffusion tests for chloropicrin were identical to those for methyl bromide.

The following Table I sets forth the numerical results of the testing. The values are expressed as ml/liter of gas diffusing per hour, per square meter, per mil. For comparison, diffusion values for a typical one mil low density polyethylene film are included in the following Table. The gas concentrations for the testing were 40 ml of methyl bromide per liter of air and 22 ml of chloropicrin per liter of air.

TABLE I

| Temperature | 1.3-mil HDPE/nylon (.1 mil nylon) | | | | 1-mil LDPE | |
|---|---|---|---|---|---|---|
| | methyl bromide | | | Chloropicrin | methyl bromide | Chloropicrin |
| 25° C. | 0.02 | 0.06 | 0.04 | nil* | 8.9 | |
| 30 | 0.06 | 0.08 | 0.07 | nil* | 12.9 | 55.5 |
| 40 | 0.11 | 0.16 | 0.14 | nil* | 20.0 | 68.3 |
| 50 | 0.28 | 0.29 | 0.28 | nil* | 27.3 | 70.7 |
| 60 | 0.51 | 0.50 | 0.51 | nil* | 33.9 | 98.4 |

*Test piece of film programmed: 2 hr at 25°, 1 hr at each of the other temp, 16 hr (overnight) at 40°, and 1 hr at 60°. Diffused chloropicrin not measurable.

Table II sets forth numerical results of the testing of a 0.1 mil nylon-6/1.0 mil low density polyethylene. One sample was tested with methyl bromide (MB) only at a concentration of 23 ml/l. Two samples were tested with mixed gases, methyl bromide at 23 ml/l and chloropicrin (CP) at 21.7 ml/l. The table shows the diffusion expressed as ml/MB/hr/M$^2$/(ml/l).

TABLE II

| Temperature | MB only | MB—CP* mixture | |
| --- | --- | --- | --- |
| 25° C. | .021 | — | — |
| 30° C. | .031 | .028 | .031 |
| 40° C. | .071 | .055 | .005 |
| 50° C. | .123 | .109 | .117 |
| 60° C. | .214 | .201 | .211 |

*No values for CP are given as diffusion is so slow only traces are detected at the highest temperature of the test.

It will be seen from the foregoing Tables, when contrasted with conventional monolayer low density polyethylene barrier films, the nylon-polyethylene laminates of the present invention provide vastly superior resistance to diffusion of methyl bromide and chloropicrin therethrough.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:

1. A method for maintaining volatile agricultural fumigants in intimate contact with soil which comprises injecting soil fumigants into said soil and subsequently covering the fumigant treated soil with a laminar film comprising a polyolefin layer having adhered to the surface thereof a polyamide coating layer.

2. The method of claim 1 wherein said soil is injected with a fumigant selected from the group consisting of methyl bromide, chloropicrin and a mixed fumigant thereof.

3. The method of claim 1 wherein said polyamide is a nylon and said polyolefin is a polyethylene.

4. The method of claim 3 wherein the film has a substantially uniform overall thickness of about 0.5 to 3 mils.

5. The method of claim 4 wherein the nylon comprises no more than 20% of the overal thickness.

6. The method of claim 5 wherein the nylon is nylon-6 and the polyethylene is of a member selected from the group consisting of a high density homopolymer, a low density homopolymer, a high density copolymer with an alpha olefin and a low density copolymer with an alpha olefin.

7. The method of claim 6 wherein the polyethylene contains a minor adhesion promoting amount of an ionomer resin blended therein.

8. A method of fumigating soil comprising the steps of treating soil with an effective amount of a diffusion fumigant; covering the fumigant-treated soil with a multilayer gas barrier film comprising a polyamide layer and a polyolefin layer; and permitting the fumigant to diffuse through the covered soil.

9. The method of claim 8 wherein said fumigant is a member of the group consisting of methyl bromide, chloropicrin, and a mixed fumigant thereof.

10. The method of claim 8 wherein said polyamide comprises a nylon and said polyolefin is a polyethylene.

11. The method of claim 10 wherein the film has a substantial overall thickness of about 0.5 to 3 mils.

12. The method of claim 11 wherein the nylon comprises no more than 20% of the overall thickness.

13. The method of claim 12 wherein the nylon is nylon-6 and the polyethylene is of a member selected from the group consisting of a high density homopolymer, a low density homopolymer, a high density copolymer with an alpha olefin and a low density copolymer with an alphaolefin.

14. The method of claim 13 wherein the polyethylene contains a minor adhesion prompting amount of an ionomer resin blended therein.

* * * * *